No. 795,116.

Patented July 18, 1905.

UNITED STATES PATENT OFFICE.

RANDOLPH HARRYSON GODDIN, OF NEWPORT NEWS, VIRGINIA.

PAINT COMPOSITION.

SPECIFICATION forming part of Letters Patent No. 795,116, dated July 18, 1905.

Application filed April 18, 1905. Serial No. 256,225.

*To all whom it may concern:*

Be it known that I, RANDOLPH HARRYSON GODDIN, a citizen of the United States, residing at Newport News, in the county of Warwick and State of Virginia, have invented certain new and useful Improvements in Paint Composition; and I do hereby declare the following to be a full, clear, and exact description of the invention, such as will enable others skilled in the art to which it appertains to make and use the same.

My invention relates to a composition to be used as a paint, and has particular reference to paints of that class applicable to coating the sides of boats and other objects which are exposed to the action of water, though of course it may be used with equal effect in other places.

The object of my invention is the production of a paint which will not in any way affect or injure surfaces of any kind, whether metallic, fibrous, or other surfaces to which it is applied, but which will serve as an effective means for repelling the attacks of all injurious marine insects and growths on vessels and will furthermore prevent their collecting and adhering to the surfaces to which this paint is applied.

Another object of my invention is to produce a paint which, while possessing the qualifications above set forth and those which will be stated hereinafter, will also be of a durable nature and of a consistency sufficient to make this paint of a lasting quality without making the composition too friable when it has become hard on the applied surfaces.

In carrying out my invention I propose to employ gas-tar, red lead, paris-green, linseed-oil, sugar of lead, sulfur, and a suitable desiccating compound. These ingredients are mixed preferably in the proportions hereinafter specified, according to the quantity of paint it is desired to make. For instance, for making a gallon of paint the following proportions are preferably employed and the ingredients are mixed in the following manner: To about one-half gallon of gas-tar add four pounds of red lead, thoroughly mixing the same, then add two pounds of paris-green, then one quart of linseed-oil, then one pound of sugar of lead and one ounce of sulfur. These ingredients are thereupon thoroughly united and mixed together, and after the same have been intimately stirred up and the separate ingredients dissolved into one unit a suitable desiccator is added in the proportions necessary for the quantity of paint which it is desired to make. Thereupon I add black asphaltum, preferably in liquid form, in the quantity of about one pint, for the purpose of strengthening the entire composition and of giving it a finished appearance and gloss when the paint is ready for use.

By using paris-green, sugar of lead, and sulfur, all of which are well-known poisonous substances, insects are prevented from contacting with the bottom of vessels and adhering thereto when the same are coated with my paint, unless they are affected by the poisonous characters of these three ingredients, so that barnacles, marine growths, worms, &c., cannot cling to any object with which my paint is coated. In order to cause the paint to adhere to surfaces to which it is applied, a proportionate quantity of gas-tar is added, which element gives body to the composition, and hence insures a better coating capability. Furthermore, wood and metals exposed either to the atmosphere or the influence of water are effectually safeguarded against oxidation and living vermin by the use of my paint, and it also prevents fouling of those bodies which are constantly subjected to the action of a variety of waters. Now in order to render the paint elastic and to prevent its breaking and cracking on surfaces where it is used I add a suitable quantity of linseed-oil, which precludes any danger of it becoming too fragile, and consequently pealing off. I use a desiccating compound or a drier principally to effect the speedy hardening of the paint, and the amount of this drier is of course measured by the time within which it is desired to have the paint become hard, it being of course preferable to use as little drier as is possible.

I have found in the course of my experiments that this paint in its finished condition is very efficient as a preservative for wood and metal, as well as for those objects which are constantly kept in water and surrounded either by mud or sand. The preservative qualities of this paint are most durable, and it has been found that one or two coats are sufficient to make this paint as resistant toward insects and marine growths as other paints which have to be applied to surfaces three or four times. By using the last-mentioned ingredient—namely, black asphaltum—the paint is given a very consistent body and is in itself very powerful to resist the attacks of any of the known marine insects. However, by reason of the fact that a great number of these insects are armed with weapons sufficient to penetrate the most hardened substances I have united with this composition some of the very poisonous chemicals, the action of which no insect could withstand.

Having thus described my invention, what I claim, and desire to secure by Letters Patent of the United States, is—

1. The process which consists in mixing gas-tar with red lead, then adding paris-green, then linseed-oil, sulfur, thoroughly mixing these ingredients and adding a drier, and finally adding a gloss-giving compound, substantially in the proportions specified.

2. The within-described composition of matter, consisting of gas-tar, red lead, paris-green, linseed-oil, sugar of lead, sulfur, a desiccating compound, and black asphaltum, substantially in the proportions specified.

In testimony whereof I have affixed my signature in presence of two witnesses.

RANDOLPH HARRYSON GODDIN.

Witnesses:
J. E. T. HUNTER,
W. T. YOUNG.